(12) United States Patent
Jun et al.

(10) Patent No.: US 11,705,769 B2
(45) Date of Patent: Jul. 18, 2023

(54) MAGNETIC GEAR

(71) Applicants: Hyundai Motor Company, Seoul (KR); Kia Corporation, Seoul (KR)

(72) Inventors: Hyun Woo Jun, Seoul (KR); Woo Suk Jung, Hwaseong-Si (KR); Hyun Seok Hong, Seoul (KR); Hee Kwang Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 203 days.

(21) Appl. No.: 17/382,929

(22) Filed: Jul. 22, 2021

(65) Prior Publication Data

US 2022/0181936 A1 Jun. 9, 2022

(30) Foreign Application Priority Data

Dec. 7, 2020 (KR) .......................... 10-2020-0169680

(51) Int. Cl.
*H02K 3/12* (2006.01)
*H02K 7/00* (2006.01)
*H02K 3/48* (2006.01)
*H02K 1/16* (2006.01)

(52) U.S. Cl.
CPC ................. *H02K 3/12* (2013.01); *H02K 1/16* (2013.01); *H02K 3/48* (2013.01); *H02K 7/003* (2013.01)

(58) Field of Classification Search
CPC .. H02K 1/16; H02K 3/12; H02K 3/48; H02K 49/00; H02K 49/10; H02K 49/102; H02K 49/106; H02K 7/003

USPC .................................................. 310/208, 209
See application file for complete search history.

(56) References Cited

U.S. PATENT DOCUMENTS

| | | | |
|---|---|---|---|
| 8,593,026 B2 | 11/2013 | Montgomery | |
| 2011/0012458 A1* | 1/2011 | Atallah | H02K 51/00 310/103 |
| 2011/0121672 A1* | 5/2011 | Calverley | H02K 49/102 310/216.113 |
| 2011/0127869 A1* | 6/2011 | Atallah | H02K 49/102 310/94 |
| 2013/0320795 A1* | 12/2013 | Enomoto | H02K 49/10 310/103 |
| 2016/0006304 A1* | 1/2016 | Tojima | H02K 49/102 310/154.02 |
| 2018/0269770 A1* | 9/2018 | Powell | H02K 1/246 |
| 2019/0341828 A1* | 11/2019 | Calverley | H02K 7/11 |
| 2022/0052596 A1* | 2/2022 | Ukaji | H02K 1/12 |
| 2022/0407402 A1* | 12/2022 | Takizawa | H02K 9/223 |
| 2023/0025203 A1* | 1/2023 | Kometani | H02N 15/00 |

(Continued)

*Primary Examiner* — Rashad H Johnson
(74) *Attorney, Agent, or Firm* — Morgan, Lewis & Bockius LLP (57) ABSTRACT

A magnetic gear may include a stator, having a stator core having a plurality of teeth extending toward a rotation shaft and a plurality of coils wound around the plurality of teeth, a rotor, having a rotor core disposed inside the stator and fixed to the rotation shaft and a plurality of permanent magnets attached to the external surface of the rotor core, and a pole-piece unit, having a plurality of first pole pieces and a plurality of second pole pieces arranged radially about the rotation shaft between the stator core and the rotor core such that the plurality of first pole pieces and the plurality of second pole pieces are alternately arranged in a circumferential direction thereof.

13 Claims, 6 Drawing Sheets

(56) References Cited

U.S. PATENT DOCUMENTS

| | | | |
|---|---|---|---|
| 2023/0045743 A1* | 2/2023 | Sakai | H02K 49/10 |
| 2023/0046584 A1* | 2/2023 | Okabe | H02K 16/02 |
| 2023/0049224 A1* | 2/2023 | Sakai | H02K 49/102 |

* cited by examiner

MAGNETIC GEAR

CROSS-REFERENCE TO THE RELATED APPLICATION

The present application claims priority to Korean Patent Application No. 10-2020-0169680, filed on Dec. 7, 2020, in the Korean Intellectual Property Office, the entire contents of which is incorporated herein for all purposes by this reference.

BACKGROUND OF THE INVENTION

Field of the Invention

The present invention relates to a magnetic gear, and more particularly to a magnetic gear having a pole-piece structure that enables a speed reduction ratio to be easily changed.

Description of Related Art

In general, a magnetic gear is a non-contact-type gear unit that transmits power in a non-contact manner using magnetic force. Unlike a gear that transmits power through physical contact, the magnetic gear has low noise and vibration, does not require injection of lubricant, is maintenance-free, and has high stability and durability due to the lack of mechanical friction.

Furthermore, since the magnetic gear operates with little energy loss, it is capable of operating with high efficiency and transmitting peak torque reliably and accurately.

Thus, in recent years, studies have been actively conducted with the goal of applying magnetic gears to various industrial fields, such as wind turbines, electric vehicles, and transmissions.

In general, a magnetic gear may include an internal rotor, an external rotor, and a plurality of pole pieces disposed between the two rotors in the state of being spaced from the two rotors.

The internal rotor and the external rotor may include permanent magnets disposed radially about a rotation shaft, and the pole pieces may be disposed radially about the rotation shaft in the state of being spaced from each other at regular intervals. The internal rotor and the external rotor may rotate in opposite directions. The magnetic gear may be used as a speed reducer or a speed increaser depending on which of the two rotors is used as an input shaft.

In such a magnetic gear, to change a gear ratio, it is required to change the number of poles of the internal rotor and/or the external rotor and to change the number of pole pieces. However, in the conventional magnetic gear, to change the number of poles of the rotor and the number of pole pieces, a process of completely disassembling and assembling the magnetic gear is required to attach/detach permanent magnets and to increase/reduce the number of pole pieces. That is, it is substantially impossible to change a gear ratio without a complicated process of disassembling and assembling the conventional magnetic gear.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a magnetic gear having a pole-piece structure that enables a speed reduction ratio to be easily changed.

In accordance with various aspects of the present invention, the above and other objects may be accomplished by the provision of a magnetic gear including a stator, including a stator core having a plurality of teeth extending toward a rotation shaft and a plurality of coils wound around the plurality of teeth, a rotor, including a rotor core disposed inside the stator and fixed to the rotation shaft and a plurality of permanent magnets attached to the external surface of the rotor core, and a pole-piece unit, including a plurality of first pole pieces and a plurality of second pole pieces arranged radially about the rotation shaft between the stator core and the rotor core such that the plurality of first pole pieces and the plurality of second pole pieces are alternately arranged in a circumferential direction thereof. The plurality of first pole pieces or the plurality of second pole pieces may be moved in the circumferential direction so that the intervals between the plurality of first pole pieces and the plurality of second pole pieces are changed.

According to various exemplary embodiments of the present invention, the number of pole pairs of the stator may be determined depending on the direction in which current flows through the plurality of coils.

According to various exemplary embodiments of the present invention, each of the plurality of coils may be a concentrated winding, and the end portion of each of the plurality of coils may be located closer to the rotation shaft than the end portion of a corresponding one of the plurality of teeth.

According to various exemplary embodiments of the present invention, the plurality of first pole pieces and the plurality of second pole pieces may be arranged to be in contact with each other or to be spaced from each other at regular intervals to determine the number of poles of the pole-piece unit.

According to various exemplary embodiments of the present invention, the plurality of first pole pieces and the plurality of second pole pieces may be arranged to have regions overlapping each other in the circumferential direction of the rotation shaft.

According to various exemplary embodiments of the present invention, the pole-piece unit may further include a first pole-piece rail on which the plurality of first pole pieces is fixedly arranged at regular intervals, the first pole-piece rail having the shape of a circle centered on the rotation shaft, and a second pole-piece rail on which the plurality of second pole pieces is fixedly arranged at regular intervals, the second pole-piece rail being arranged concentrically with the first pole-piece rail. The first pole-piece rail or the second pole-piece rail may be rotated to adjust the intervals between the plurality of first pole pieces and the plurality of second pole pieces.

According to various exemplary embodiments of the present invention, each of the plurality of first pole pieces may have an extension portion extending toward the second pole-piece rail, and each of the plurality of second pole pieces may have an extension portion extending toward the first pole-piece rail such that the plurality of first pole pieces and the plurality of second pole pieces have regions overlapping each other in the circumferential direction of the rotation shaft.

According to various exemplary embodiments of the present invention, the pole-piece unit may further include a plurality of recesses formed in internal surfaces of the first pole-piece rail and the second pole-piece rail that surface each other and a rail-moving gear having a plurality of teeth engaged into the plurality of recesses.

According to various exemplary embodiments of the present invention, the pole-piece unit may further include an operation clip connected at opposite end portions thereof to the first pole-piece rail and the second pole-piece rail and configured to be rotatable in both directions about the center portion thereof to rotate the first pole-piece rail and the second pole-piece rail in opposite directions.

According to various exemplary embodiments of the present invention, the pole-piece unit may further include a bearing press-fitted to the rotation shaft to rotate freely relative to the rotation shaft and a rail guard configured to fix the first pole-piece rail and the second pole-piece rail to the bearing.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a magnetic gear according to exemplary embodiments of the present invention will be described in detail with reference to the accompanying drawings. In the description and claims set forth below, the term "magnetic gear" should be understood as including a magnetic geared motor that not only serves as a general gear but also outputs rotational force at a speed reduction ratio or an acceleration ratio.

Figure 1:
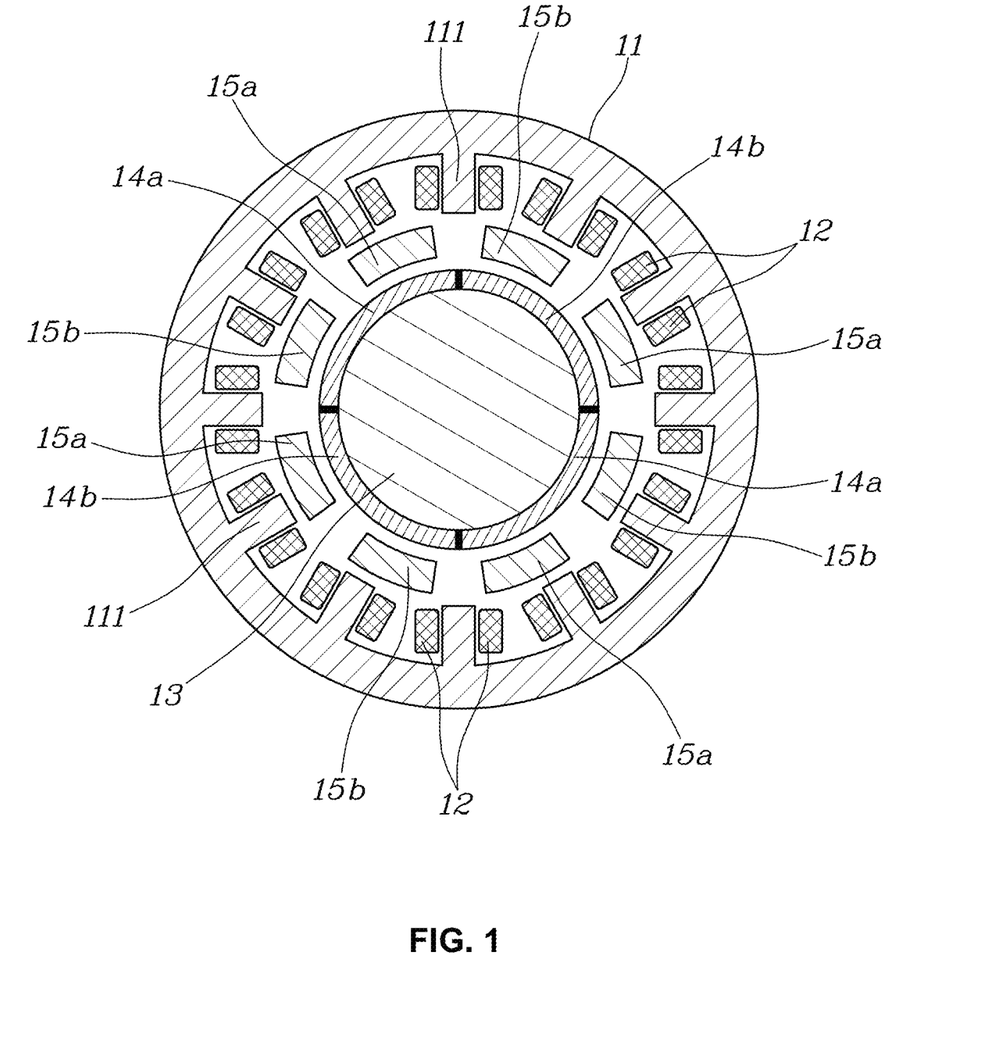
FIG. 1 is a cross-sectional view showing a first state of a magnetic gear according to various exemplary embodiments of the present invention.
Figure 2:
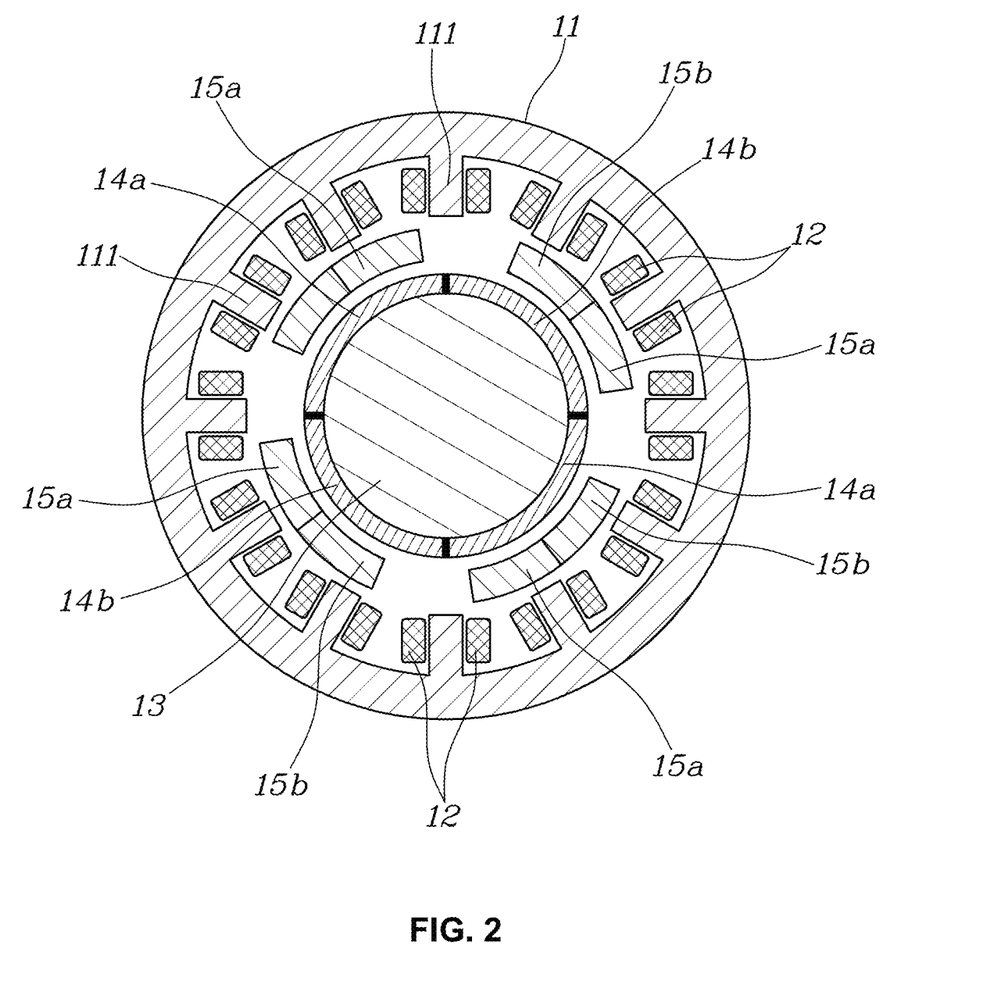
FIG. 2 is a cross-sectional view showing a second state of the magnetic gear according to the exemplary embodiment of the present invention.
Figure 3:
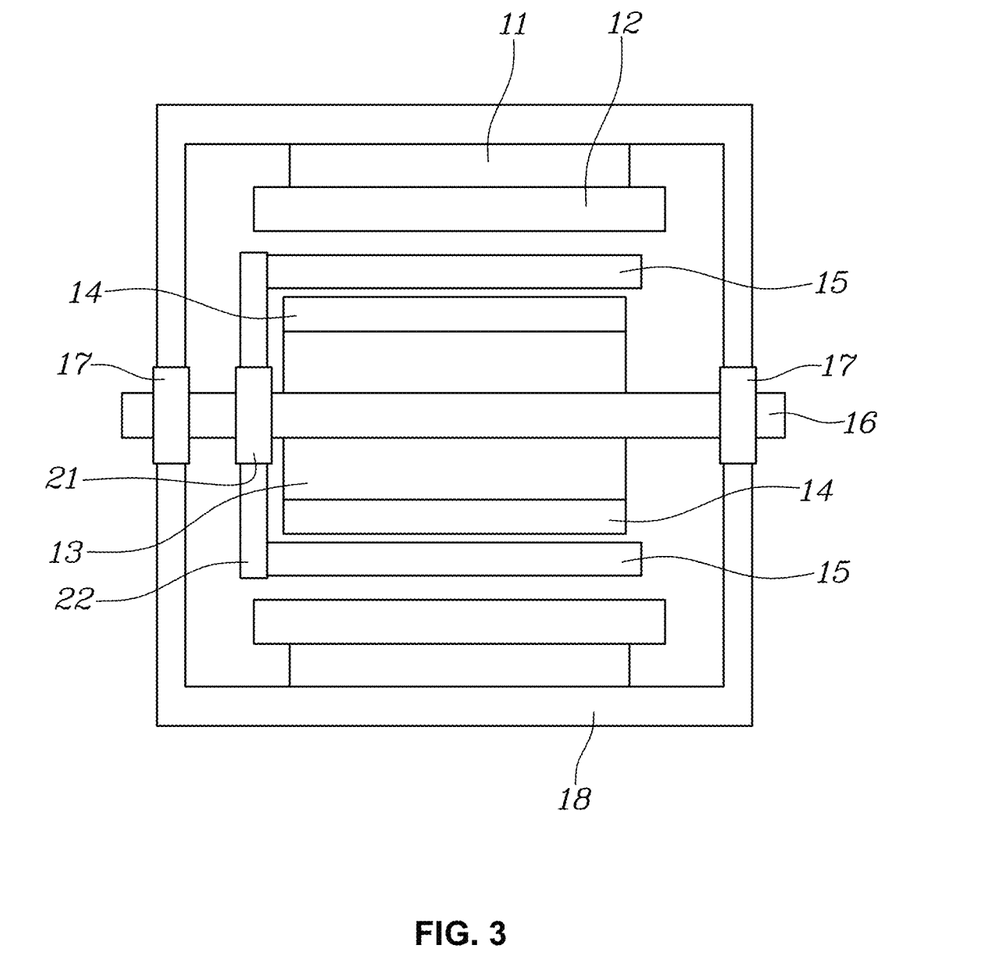
FIG. 3 is a side-sectional view of the magnetic gear according to the exemplary embodiment of the present invention.

FIG. 1 is a cross-sectional view showing a first state of a magnetic gear according to various exemplary embodiments of the present invention, FIG. 2 is a cross-sectional view showing a second state of the magnetic gear according to the exemplary embodiment of the present invention, and FIG. 3 is a side-sectional view of the magnetic gear according to the exemplary embodiment of the present invention.

Referring to FIG. 1, FIG. 2, and FIG. 3, a magnetic gear according to various exemplary embodiments of the present invention may include a stator, which includes a stator core 11 having a plurality of teeth 111 extending toward a rotation shaft 16 and a plurality of coils 12 wound around the teeth 111, a rotor, which includes a rotor core 13 disposed inside the stator and fixed to the rotation shaft 16 and a plurality of permanent magnets 14a and 14b attached to the external surface of the rotor core 13, and a pole-piece unit, which includes a plurality of first pole pieces 15a and a plurality of second pole pieces 15b arranged radially about the rotation shaft 16 between the stator and the rotor such that the first pole pieces 15a and the second pole pieces 15b are alternately arranged to have regions overlapping each other in the circumferential direction thereof.

Furthermore, according to the exemplary embodiment of the present invention, the first pole pieces 15a or the second pole pieces 15b may be movable about the rotation shaft 16 in the circumferential direction thereof. The first pole pieces 15a and the second pole pieces 15b may be in contact with each other, or may be spaced from each other at regular intervals.

Furthermore, according to the exemplary embodiment of the present invention, the number of pole pairs of the stator may be determined by adjusting the direction in which current flows through the coils 12 provided at the stator.

The present invention relates to a structure that realizes two or more speed reduction ratios using a single magnetic gear. Various combinations of the number of pole pairs of the stator, the number of pole pairs of the rotor, and the number of pole pieces may be possible. Hereinafter, an example of changing a gear ratio by selectively utilizing the combination of a 12-pole stator, a 4-pole rotor and an 8-pole pole-piece unit and the combination of a 4-pole stator, a 4-pole rotor and a 4-pole pole-piece unit will be described with reference to FIG. 1 and FIG. 2.

When the examples shown in FIG. 1 and FIG. 2 are simply used as a magnetic gear, they are magnetized by applying direct current to the coils 12 of the stator through a slip ring, and thus apply mechanical input (torque input). When used as a magnetic geared motor, a rotating magnetic field may be generated by applying alternating current to the coils 12 of the stator. That is, whether a magnetic gear is a pure magnetic gear or a magnetic geared motor is determined depending on whether a stator disposed at the external side rotates physically or generates a rotating magnetic field without rotating physically. However, the pure magnetic gear and the magnetic geared motor have substantially the same structure. Thus, as described above, the term "magnetic gear" mentioned in the description and claims set forth below may be understood as including a magnetic geared motor.

In a magnetic gear, the number of poles ($Q_m$) of a pole-piece unit is determined by the number of pole pairs of a stator disposed at the external side and the number of pole pairs of a rotor disposed at the internal side, as expressed using Equation 1 below. The gear ratio (Gr) of a magnetic gear is determined using Equation 2 below.

$$Q_m = P_1 + P_h,\qquad\text{[Equation 1]}$$

wherein $Q_m$ is number of poles of pole-piece unit, $P_1$ is number of pole pairs of stator, and $P_h$ is number of pole pairs of rotor $$Gr = (P_1)/(Q_m - P_h) = P_1/P_h \qquad\text{[Equation 2]}$$

In the example shown in FIG. 1, when current flows through each of the coils of the stator in a direction different from that in other coils adjacent thereto, the stator has a total of 12 pole pairs. According to Equations 1 and 2 above, the pole-piece unit has a total of 8 poles, the number of pole pairs of the stator is 6, and the number of pole pairs of the rotor is 2. In the instant case, the gear ratio is 3.

The example shown in FIG. 2 is configured such that the first pole pieces 15a and the second pole pieces 15b are brought into contact with each other by moving the pole-piece unit of the example shown in FIG. 1 in the circumferential direction thereof. The total number of poles of the pole-piece unit is 4, and the number of pole pairs of the rotor is still 2, which is determined by the fixed number of permanent magnets. In the instant case, according to Equation 1 above, the stator needs to have 2 pole pairs. To the present end, current flows through a group of three neighboring coils in one direction thereof, and current flows through other coil groups, adjacent thereto, in the opposite direction thereof. In the instant case, the gear ratio is 1.

That is, according to the exemplary embodiments of the present invention, the number of poles of the pole-piece unit may be determined by moving the positions of the pole pieces, and the direction in which current flows through the coils 12 of the stator may be appropriately determined depending on the determined number of poles of the pole-piece unit, adjusting the number of pole pairs of the stator, thus changing the gear ratio of the magnetic gear.

As shown in FIG. 3, each of the coils 12 may be implemented as a concentrated winding wound around a corresponding one of the teeth 111 of the stator core 11, and the end portion of each of the coils 12 may be located closer to the rotation shaft 16 than the end portion of a corresponding one of the teeth 111.

The rotation shaft 16 may be disposed at the center portion of the rotor core 13. The rotor core 13 may rotate coaxially about the rotation shaft 16. A first bearing 17 and a second bearing 21 may be press-fitted to the rotation shaft 16.

The first bearing 17 may be disposed between the rotation shaft 16 and a housing 18 to minimize friction with the housing 18, securing smooth rotation of the rotation shaft 16.

The second bearing 21 is a bearing that forms the pole-piece unit to rotate the pole pieces. The second bearing 21 may be disposed to rotate freely relative to the rotation shaft 16.

Hereinafter, the structure of the pole-piece unit facilitating adjustment of the intervals between the first pole pieces and the second pole pieces will be described in more detail.

Figure 4:
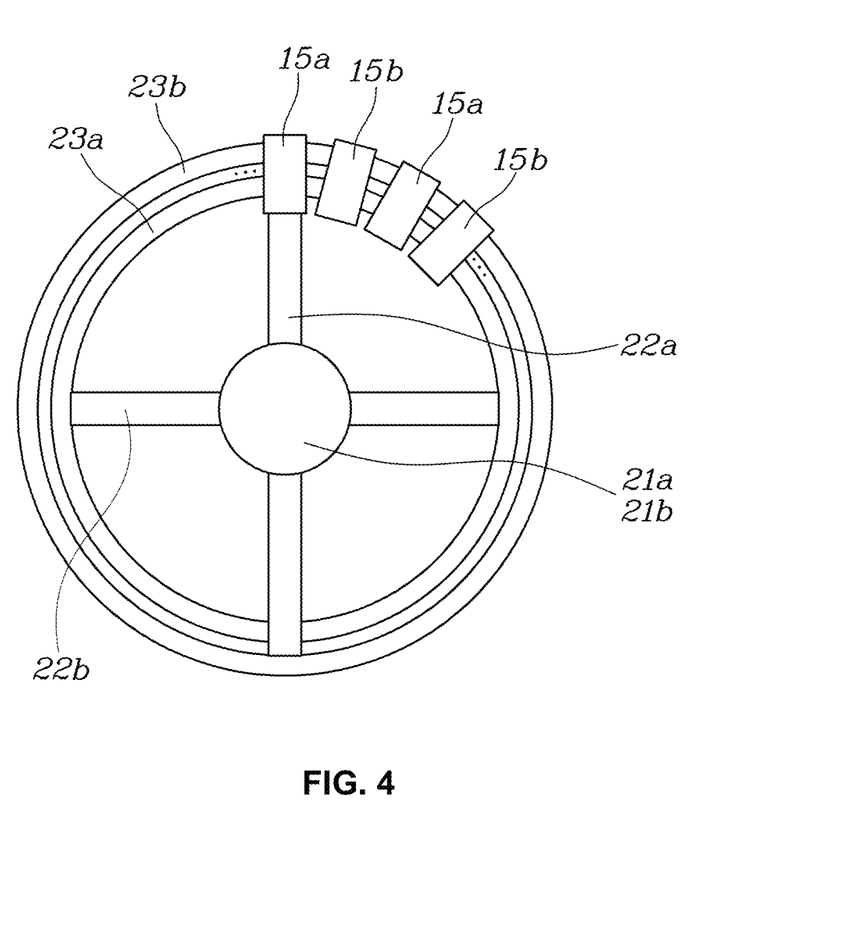
FIG. 4 is a plan view showing a pole-piece unit provided in the magnetic gear according to the exemplary embodiment of the present invention.
Figure 5:
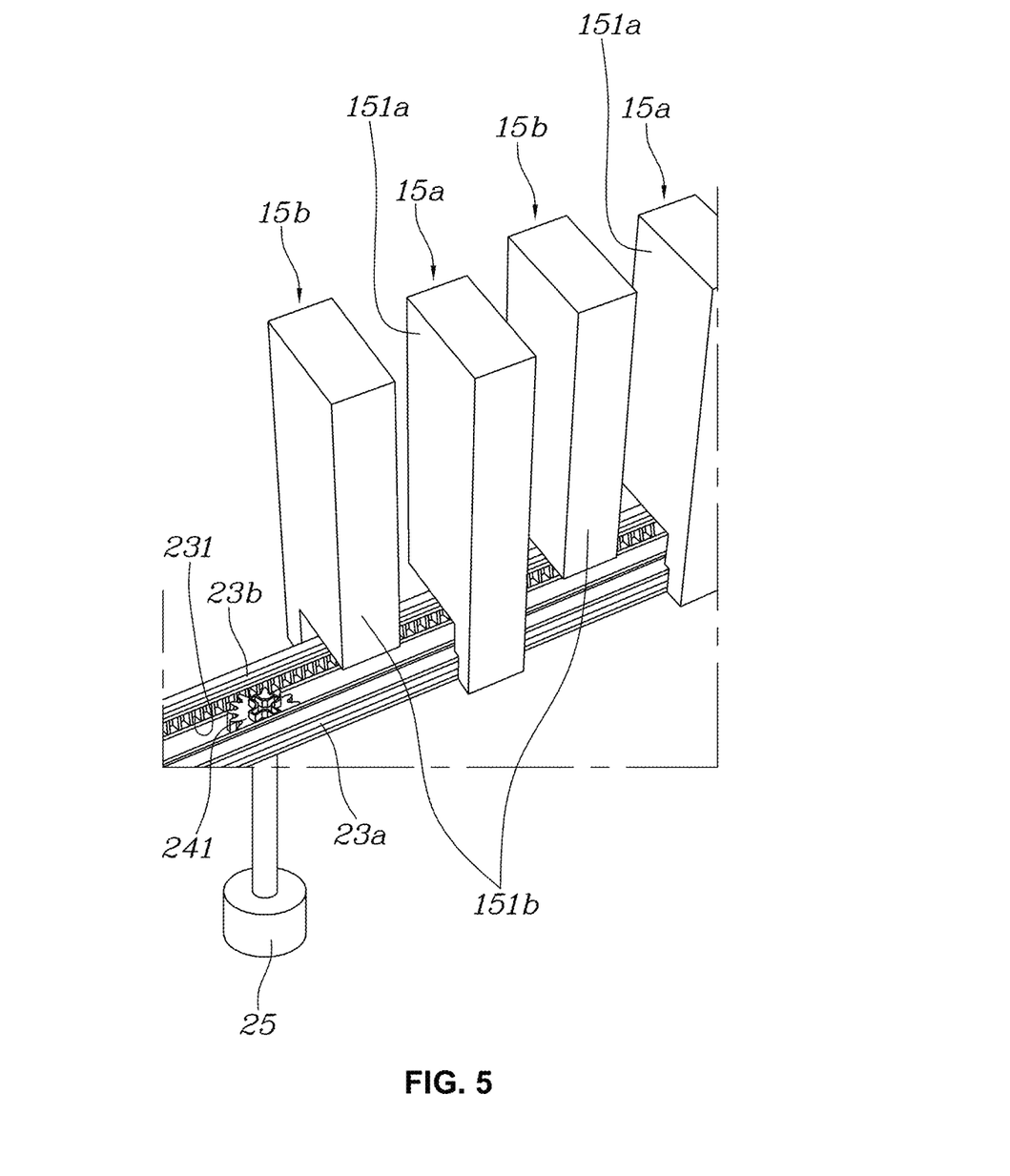
FIG. 5 and FIG. 6 are partially perspective views showing various examples of the pole-piece unit of the magnetic gear according to the exemplary embodiment of the present invention in detail.
Figure 6:
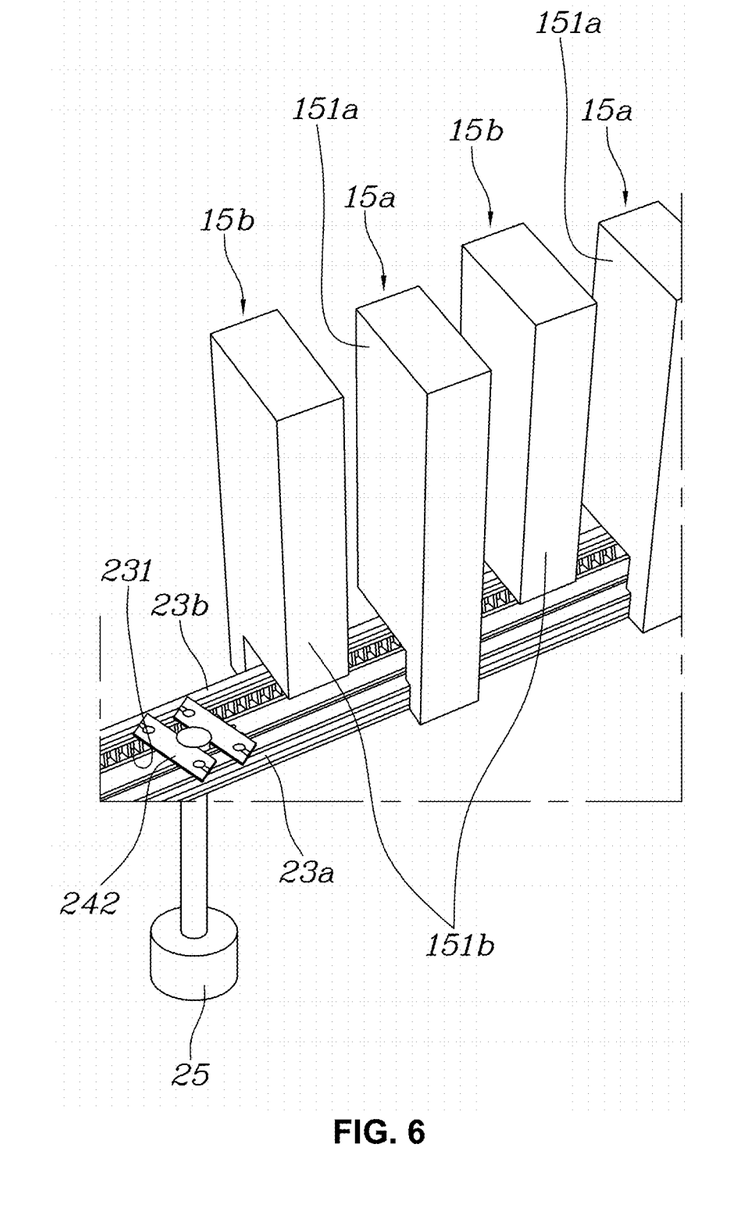

FIG. 4 is a plan view showing the pole-piece unit provided in the magnetic gear according to the exemplary embodiment of the present invention, and FIG. 5 and FIG. 6 are partially perspective views showing various examples of the pole-piece unit of the magnetic gear according to the exemplary embodiment of the present invention in detail.

Referring to FIG. 4, FIG. 5 and FIG. 6, the pole-piece unit provided in the magnetic gear according to the exemplary embodiment of the present invention may include a first pole-piece rail 23a, on which the first pole pieces 15a are fixedly disposed at regular intervals, and a second pole-piece rail 23b, on which the second pole pieces 15b are fixedly disposed at regular intervals.

The first pole-piece rail 23a and the second pole-piece rail 23b may be disposed concentrically about the rotation shaft 16, and at least one of the first pole-piece rail 23a or the second pole-piece rail 23b may be formed to be rotatable about the rotation shaft 16.

The first pole-piece rail 23a and the second pole-piece rail 23b may be connected to different second bearings 21a and 21b via different respective rail guards 22a and 22b. The second bearings 21a and 21b may be coupled to the rotation shaft 16. The second bearings 21a and 21b form the pole-piece unit. The second bearings 21a and 21b may be press-fitted to the rotation shaft 16 to rotate freely relative thereto. The positions of the pole pieces of the pole-piece unit may be determined by rotating the pole-piece rails 23a and 23b using the second bearings 21a and 21b. In the example shown in FIG. 4, the second bearings 21a and 21b are disposed to overlap each other in the direction of the drawing sheet.

Furthermore, the first pole-piece rail 23a and the second pole-piece rail 23b may rotate about the rotation shaft 16 in the manner of being interlocked with each other. For example, when the first pole-piece rail 23a rotates to a predetermined angle in one direction thereof, the second pole-piece rail 23b may rotate to the same angle in the opposite direction thereof. The structural feature facilitating interlocking rotation of the first pole-piece rail 23a and the second pole-piece rail 23b will be described later.

The first pole-piece rail 23a and/or the second pole-piece rail 23b rotates about the rotation shaft 16, so that the intervals between the first pole pieces 15a attached to the first pole-piece rail 23a and the second pole pieces 15b attached to the second pole-piece rail 23b may be changed. As shown in FIG. 1, in the state in which the first pole pieces 15a and the second pole pieces 15b are disposed at regular intervals, the number of poles of the pole-piece unit is the same as the sum of the number of the first pole pieces 15a and the number of the second pole pieces 15b. Alternatively, as shown in FIG. 2, in the state in which each of the first pole pieces 15a is in contact with a corresponding one of the second pole pieces 15b, the number of poles of the pole-piece unit is the same as the number of the first pole pieces 15a or the number of the second pole pieces 15b. Of course, the number of the first pole pieces 15a and the number of the second pole pieces 15b may be the same.

Furthermore, a device facilitating the above-described interlocking rotation of the first pole-piece rail 23a and the second pole-piece rail 23b may be provided.

As various exemplary embodiments of the present invention, referring to FIG. 5, a rail-moving gear 241 may be disposed between the first pole-piece rail 23a and the second pole-piece rail 23b. The first pole-piece rail 23a and the second pole-piece rail 23b may have a plurality of recesses 231 formed in the surfaces thereof that face each other, and the teeth of the rail-moving gear 241 may be inserted into the recesses 231. Accordingly, it is possible to adjust the intervals between the first pole pieces 15a and the second pole pieces 15b by rotating the rail-moving gear 241.

The rail-moving gear 241 may be connected to the rotation shaft of a servo-actuator 25 so that the amount of rotation thereof may be adjusted. Since the servo-actuator 25 is configured to stop operating at a specific position, it is configured for moving the first pole-piece rail 23a and the second pole-piece rail 23b to desired positions and of maintaining the positions of the first pole-piece rail 23a and the second pole-piece rail 23b.

As another example of facilitating the interlocking rotation of the first pole-piece rail 23a and the second pole-piece rail 23b, referring to FIG. 6, an operation clip 242 may be provided to move the first pole-piece rail 23a and the second pole-piece rail 23b so that the intervals between the pole pieces 15a and 15b are adjusted and to maintain the positions of the first pole-piece rail 23a and the second pole-piece rail 23b. The operation clip 242 may be connected at opposite end portions thereof to the first pole-piece rail 23a and the second pole-piece rail 23b, and may be connected at the center portion thereof to the rotation shaft of the servo-actuator 25 so that the amount of rotation thereof may be adjusted. Accordingly, opposite end portions of the operation clip 242 may be rotated in both directions about the center portion thereof by the servo-actuator 25, so that the two pole-piece rails 23a and 23b may be rotated to a desired angle in opposite directions.

The first pole pieces 15a and the second pole pieces 15b may be disposed radially about the rotation shaft 16 to have effective regions overlapping each other in the circumferential direction thereof. Considering that the first pole-piece rail 23a and the second pole-piece rail 23b are disposed on different concentric circles, each of the first pole pieces 15a may have an extension portion 151a extending from an upper portion thereof above the first pole-piece rail 23a toward the second pole-piece rail 23b. Similarly, each of the second pole pieces 15b may have an extension portion 151b extending from an upper portion thereof above the second pole-piece rail 23b toward the first pole-piece rail 23a. Due to the present structure, the first pole pieces 15a and the second pole pieces 15b may have regions overlapping each other in the circumferential direction about the rotation shaft 16.

As is apparent from the above description, according to the magnetic gear of the present invention, since two or more speed reduction ratios are realized using a single structure, it is possible to avoid an increase in the overall weight or volume of the system caused by provision of a separate speed reducer.

Furthermore, according to the magnetic gear of the present invention, since the extent to which the speed may be reduced increases, it is possible to increase the output range and the high-efficiency operation range when used as a magnetic geared motor.

Furthermore, according to the magnetic gear of the present invention, since the speed reduction ratio may be continuously changed, it is possible to continuously select an optimum speed reduction ratio according to the driving profile of the magnetic geared motor.

However, the effects achievable through the present invention are not limited to the above-mentioned effects, and other effects not mentioned herein will be clearly understood by those skilled in the art from the above description.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A magnetic gear apparatus, comprising:
    a stator including a stator core having a plurality of teeth extending toward a rotation shaft and a plurality of coils wound around the plurality of teeth;
    a rotor including a rotor core disposed inside the stator and fixed to the rotation shaft and a plurality of permanent magnets attached to an external surface of the rotor core; and
    a pole-piece unit including a plurality of first pole pieces and a plurality of second pole pieces arranged radially about the rotation shaft between the stator core and the rotor core so that the plurality of first pole pieces and the plurality of second pole pieces are alternately arranged in a circumferential direction of the rotation shaft,
    wherein the plurality of first pole pieces or the plurality of second pole pieces is selectively movable in the circumferential direction so that intervals between the plurality of first pole pieces and the plurality of second pole pieces are adjustable.

2. The magnetic gear apparatus of claim 1, wherein a number of pole pairs of the stator is determined according to a direction in which current flows through the plurality of coils.

3. The magnetic gear apparatus of claim 1,
    wherein each of the plurality of coils is a concentrated winding, and
    wherein an end portion of each of the plurality of coils is located closer to the rotation shaft than an end portion of a corresponding one of the plurality of teeth.

4. The magnetic gear apparatus of claim 1, wherein the plurality of first pole pieces and the plurality of second pole pieces are configured to be arranged to be in contact with each other or to be spaced from each other at the intervals to determine a number of poles of the pole-piece unit.

5. The magnetic gear apparatus of claim 1, wherein the plurality of first pole pieces and the plurality of second pole pieces are arranged to have regions overlapping each other in the circumferential direction of the rotation shaft.

6. The magnetic gear apparatus of claim 1, wherein the pole-piece unit further includes:
    a first pole-piece rail on which the plurality of first pole pieces is fixedly arranged at predetermined intervals, the first pole-piece rail having a shape of a circle centered on the rotation shaft; and
    a second pole-piece rail on which the plurality of second pole pieces is fixedly arranged at predetermined intervals, the second pole-piece rail being arranged concentrically with the first pole-piece rail, wherein the first pole-piece rail or the second pole-piece rail is configured to be rotated to adjust the intervals between the plurality of first pole pieces and the plurality of second pole pieces.

7. The magnetic gear apparatus of claim 6, wherein each of the plurality of first pole pieces has an extension portion extending toward the second pole-piece rail, and each of the plurality of second pole pieces has an extension portion extending toward the first pole-piece rail so that the plurality of first pole pieces and the plurality of second pole pieces have regions overlapping each other in the circumferential direction of the rotation shaft.

8. The magnetic gear apparatus of claim 6, wherein the pole-piece unit further includes:
   a plurality of recesses formed in internal surfaces of the first pole-piece rail and the second pole-piece rail that face each other; and
   a rail-moving gear having a plurality of teeth engaged into the plurality of recesses.

9. The magnetic gear apparatus of claim 8, wherein a servo-actuator is connected to a center portion of the rail-moving gear.

10. The magnetic gear apparatus of claim 6, wherein the pole-piece unit further includes:
    an operation clip, wherein each of opposite end portions of the operation clip is pivotally connected to the first pole-piece rail and the second pole-piece rail, respectively, and configured to be rotated in first and second directions about a center portion of the operation clip to rotate the first pole-piece rail and the second pole-piece rail in opposite directions each other.

11. The magnetic gear apparatus of claim 10, wherein a servo-actuator is connected to a center portion of the operation clip.

12. The magnetic gear apparatus of claim 6, wherein the pole-piece unit further includes:
    a bearing press-fitted to the rotation shaft to rotate freely relative to the rotation shaft; and
    a rail guard fixing the first pole-piece rail and the second pole-piece rail to the bearing.

13. The magnetic gear apparatus of claim 12,
    wherein the rail guard includes a first rail guard and a second rail guard, and
    wherein the bearing includes a first bearing to which the first pole-piece rail is connected via the first rail guard, and a second bearing to which the second pole-piece rail is connected via the second rail guard.

* * * * *